G. R. WYMAN.
MACHINE FOR CUTTING SHINGLES.
APPLICATION FILED JAN. 19, 1917.
1,263,987.
Patented Apr. 23, 1918.
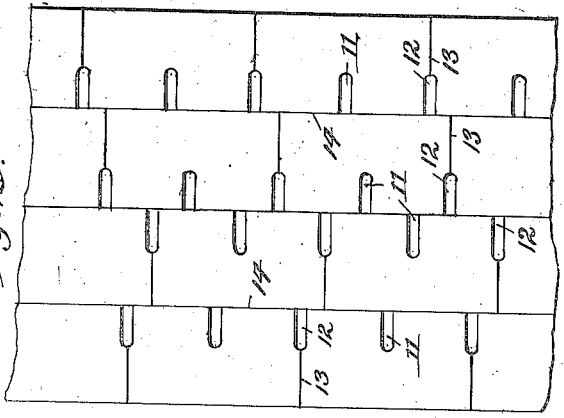
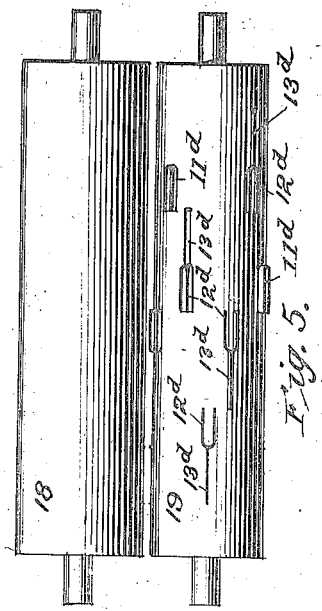
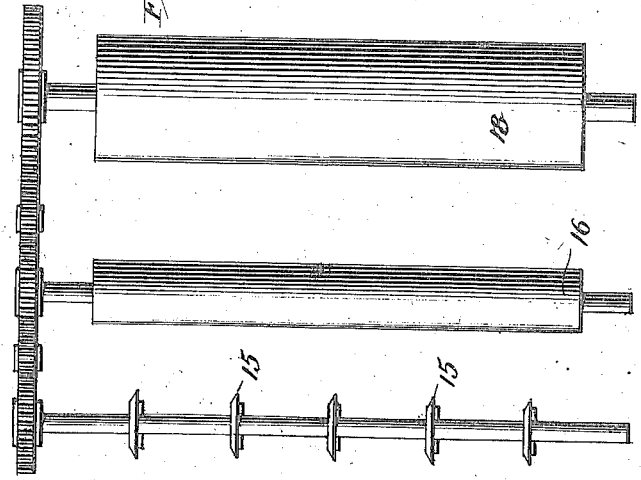
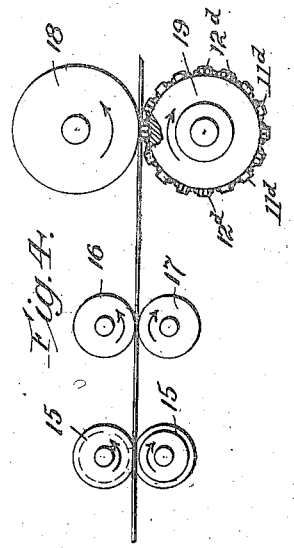
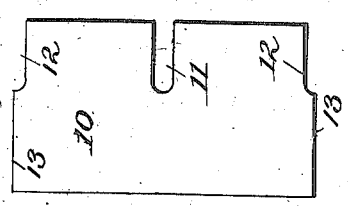
Inventor
GEORGE R. WYMAN,
By Dodge &c Sons,
Attorneys

UNITED STATES PATENT OFFICE.

GEORGE R. WYMAN, OF WALPOLE, MASSACHUSETTS, ASSIGNOR TO CHARLES S. BIRD, OF WALPOLE, MASSACHUSETTS.

MACHINE FOR CUTTING SHINGLES.

1,263,987.  Specification of Letters Patent.  Patented Apr. 23, 1918.

Application filed January 19, 1917. Serial No. 143,302.

*To all whom it may concern:*

Be it known that I, GEORGE R. WYMAN, a citizen of the United States, residing at Walpole, in the county of Norfolk and State of Massachusetts, have invented a certain new and useful Improvement in Machines for Cutting Shingles, of which the following is a specification.

My present invention pertains to an improved machine for cutting shingles, and more particularly so-called fiber shingles formed from paper or other fibrous stock, and usually treated with water-repellent and fireproofing substances or mixtures, and with a weather-resistant surface. Ordinarily the stock from which such shingles are cut is in web form, which web initially is passed through the necessary baths, and coated with grit or sand subjected to pressure.

The web of material thus produced is more or less difficult to cut, and particularly so where portions are died out or removed, as for instance where the shingle is a so-called "twin shingle", which has a notch extending inwardly from one edge, and a half-notch adjacent each end, with a cut or line of severance, between adjacent shingles, the line or cut being coincident with the notch which forms the two half-notches at the adjacent shingle ends.

The object of the present invention is to produce a machine to effect this cutting and dieing out operation in which the strain on the machine is reduced to a minimum and the life of the cutter prolonged. The essential novelty resides in the cutter or die.

The invention will be best understood upon reference to the annexed drawings, wherein:

Figure 1 is a plan of a shingle produced by the machine hereinafter described.

Fig. 2 a like view of a portion of the web which has been cut;

Fig. 3 a plan view of so much of the machine as is necessary to an understanding of the invention;

Fig. 4 a side elevation thereof; and

Fig. 5 a front elevation showing the die-roll and die.

Referring to Figs. 1 and 2, 10 denotes the shingle body, provided with a centrally-disposed notch 11, extending inwardly from one edge thereof. At each end, and extending in from the same edge as the notch 11, is a half-notch, designated by 12, which half-notches, as will be seen upon reference to Fig. 2, are originally formed as a complete notch, from the base or curved inner end of which extends a straight line cut 13. Said cuts, combined with the notches 12, are of a length equal to the height of the shingle, or its measurement from the butt to the tip thereof.

The web from which the shingles are cut is preferably slitted longitudinally on lines 14, the web passing between slitters 15, Figs. 3 and 4, thence between upper and lower feed rolls 16 and 17, and from these to and between the die roll 18 and the cylindrical die 19. Said die is formed (or in other words, the cutting elements thereon are so positioned and rotated) that a minimum number of cutters, or dies, are acting in conjunction with the die roll 18 at one and the same time.

Thus upon reference to Figs. 5 and 3 and considering the latter as a projection or plan of the die, it will be noted that no two dies or cutters are in longitudinal alinement, the purely notching dies or cutters being designated in Fig. 5 by $11^d$ and the combined notching dies and end or transverse cutters by $12^d$ and $13^d$ respectively. It will also be noted that the cutters $13^d$ extend in opposite directions to each side of the center of the roll, and that the various cutters and dies are so positioned or spaced that each strip as it passes from the slitters 15 will be cut and formed into shingles of the "twin" type without any waste whatsoever. In other words, each circumferential series of cutters is so spaced that as the web passes between the die roll and cylindrical roll it will be cut into the predetermined shingle-length and each shingle will be notched, as above set forth.

By arranging the cutters and dies in the manner specified the shingles can be produced with a minimum of strain on the machine, and with an increase in the life of the cutters.

Having thus described my invention, what I claim is:

1. A cylindrical die, having slitting dies and cutting-out dies both arranged longitudinally of the body in series and extending circumferentially of the body, the dies being out of longitudinal alinement with each other.

2. A cylindrical die having slitting dies and cutting dies extending longitudinally along the outer surface of the body and arranged in series circumferentially of the body, the dies of each circumferential series being out of alinement with those of the other series.

3. A cylindrical die having a plurality of series of circumferentially arranged, combined slitting and dieing-out cutters extending longitudinally of the die, the cutters being arranged in alternation to produce a notch and a combined notch and slit, the cutters of each circumferential series being out of alinement with those of the other series.

4. A cylindrical die having a plurality of series of circumferentially arranged, longitudinally-extending, substantially U-shaped notching cutters, the cutters of each series being in circumferential alinement, and the cutters of each and all of the series being out of longitudinal alinement with those of the other series; and a straight slitting cutter extending from the bottom of each alternate notching cutter and terminating in a plane passing through the outer terminals of the notching cutters toward which they extend.

In testimony whereof I have signed my name to this specification.

GEORGE R. WYMAN.